United States Patent [19]

Ito et al.

[11] 4,175,171
[45] Nov. 20, 1979

[54] CATALYST FOR POLYMERIZING α-OLEFINS

[75] Inventors: Akira Ito, Yokohama; Heizo Sasaki, Tokyo; Masanori Osawa, Yokohama; Tetsuya Iwao, Zushi; Kenji Iwata, Yokohama, all of Japan

[73] Assignee: Mitsui Toatsu Chemicals, Inc., Tokyo, Japan

[21] Appl. No.: 814,690

[22] Filed: Jul. 11, 1977

[30] Foreign Application Priority Data

Aug. 2, 1976 [JP] Japan .................................. 51-91330
Aug. 4, 1976 [JP] Japan .................................. 51-91331
Apr. 4, 1977 [JP] Japan .................................. 52-37651

[51] Int. Cl.² .......................... C08F 4/02; C08F 10/06
[52] U.S. Cl. ............................... 526/125; 252/429 B; 252/429C; 526/153; 526/351; 526/906
[58] Field of Search ....................... 252/429 B, 429 C; 526/125

[56] References Cited

U.S. PATENT DOCUMENTS 4,028,481 6/1977 Shiomura et al. .................. 526/142
4,069,169 1/1978 Toyoda et al. ...................... 526/125

FOREIGN PATENT DOCUMENTS 2137872 2/1972 Fed. Rep. of Germany ........... 526/125
2230672 12/1972 Fed. Rep. of Germany ........... 526/125
2347577 5/1974 Fed. Rep. of Germany ........... 526/125
50-126590 10/1975 Japan .
52-15589 2/1977 Japan .
1335887 10/1973 United Kingdom ..................... 526/125

Primary Examiner—Edward J. Smith
Attorney, Agent, or Firm—Lane, Aitken & Ziems

[57] ABSTRACT

A catalyst for polymerizing α-olefins composed of a titanium composition formed by heating a co-comminuted mixture of a magnesium halide and a complex of an aluminum halide and a carboxylic acid ester of the formula $R^1COOR^2$, with titanium tetra-chloride; and an organic aluminum compound of the formula $AlR^3mH_{3-m}$; and optionally added thereto at least one component selected from an alkyl aluminum halide of the formula $AlR^4nX_{3-n}$; a carboxylic acid ester of the formula $R^5COOR^6$; and its complex formed with an aluminum halide; is disclosed.

17 Claims, No Drawings

CATALYST FOR POLYMERIZING α-OLEFINS

BACKGROUND OF THE INVENTION

The present invention relates to a catalyst for polymerizing α-olefins, more specifically a catalyst composed of a titanium composition formed by heating a co-comminuted mixture of a magnesium halide and a complex of a aluminum halide and a carboxylic acid ester with titanium tetra-chloride; and an organic aluminum compound, and optionally added thereto at least one component selected from an alkyl aluminum halide, a carboxylic acid ester and its complex formed with an aluminum halide.

Previously, in, for example, propylene polymerization various kinds of improved catalysts containing commercially available titanium trichloride and diethyl aluminum monochloride as the major components thereof have been used; in such cases, the weight ratio of a residual polypropylene to the totally resultant polymer, determined by a boiling n-heptane extraction test, (hereinafter referred to as "Total II") was e.g. 90~95 wt. %, but the polypropylene as obtained by the polymerization was liable to contain 30~200 ppm of titanium.

Properties of polypropylene such as weather-proofness, heat resistance and color shade vary depending on the nature of stabilizer which may be used and these properties become worse if a transition metal such as titanium has been left therein.

In order to avoid this problem, the resultant polymer has been commercially sold after subjecting the catalyst used with, for example, an alcohol to decomposition followed by aftertreatments such as washing and deashing. In the case where high quality polypropylene is required, the aftertreatment has to be carried out so that the titanium content of same is lowered to about 3~10 ppm in general.

Therefore, a catalyst having such an improved activity that yield of polypropylene may be increased up to about 100~300 Kg/g-Ti (corresponding to 3~10 ppm of titanium content contained in the polymer) and capable of giving a polypropylene having higher total II, is required in order to effect the so-called non-deashing process which does not need the aftertreatment mentioned above.

Recently, a process for greatly improving polymerization activity of a Ziegler catalyst by supporting the titanium component of the Ziegler catalyst on a carrier has been developed and generally used as a polymerization catalyst for ethylene. However, in the case where a well-known carrier type catalyst is used for the polymerization of α-olefins such as propylene, butene and a higher homologue, it is difficult to obtain a polymer having an isotactic structure and the use of the catalyst is not practical because useful polymers having higher crystallinity cannot be obtained.

The carrier type catalyst having higher polymerization activity only as used in ethylene polymerization is not suitable for the purpose of realizing the non-deashing process in an α-olefin polymerization; and it is a technically important problem to develop a catalyst capable of maintaining the crystallinity of the resultant polymer as well as having high catalytic activity.

Processes are disclosed in Japanese Laid-Open Patent Publication Nos. 9342/72, 16986/73, 16987/73, 16988/73 and 86482/74, for improving the crystallinity of a resultant polymer by adding an organic compound of an electron donor type as the third component to a carrier type catalyst comprising a titanium compound supported on a magnesium halide and tri-alkyl-aluminum.

In the polymerization of propylene with a catalyst of a two-component system comprising titanium component supported on a carrier and tri-alkyl-aluminum compound, the crystallinity of the resultant polymer is extremely low despite the high polymerization activity of the catalyst.

Although the crystallinity of the resultant polymer is improved by adding an organic compound of an electron donor type to the catalyst, the aforementioned process is not practically satisfactory due to the fact that the polymerization activity of the catalyst is considerably lowered.

Another problem in the aforesaid three component system catalyst resides in the fact that the activity of the polymerization catalyst becomes higher with a large amount of tri-alkyl-aluminum, but the crystallinity of the resultant polymer becomes lower; and conversely the activity of the catalyst becomes lower when a smaller amount of tri-alkyl-aluminum is used to improve the crystallinity of the resultant polymer. Further, when an alkyl aluminum halide of the formula:

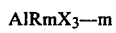

(wherein R stands for an alkyl radical and m is a number defined by $1.5 \leq m \leq 3$) is used as an organic aluminum compound in lieu of tri-alkyl-aluminum, both the polymerization activity of the catalyst and the crystallinity of the resultant polymer are low and the catalyst cannot be practically used.

There is disclosed in Japanese Laid-Open Patent Publication No. 9342/72 the use of a hydride of a metal in the Groups I~III of the Periodic Table or an organic compound containing a metal as a second component to be combined with titanium component supported on a carrier. However, when the alkyl aluminum halide was used, both the polymerization activity of the catalyst and the crystallinity of the resultant polymer were very low as will be referred to hereinafter, and the catalyst could not be practically used.

In the Japanese Laid-Open Patent Publication Nos. 16986/73, 16987/73, 16988/73 and 86482/74, there is disclosed only the use of trialkyl aluminum as the second component.

DESCRIPTION OF THE INVENTION

It has now been found, surprisingly, by the inventors of the present invention that a catalyst composed of (A) an activated titanium composition formed by heating a co-comminuted mixture of a magnesium halide and a complex of carboxylic acid ester and an aluminum halide with titanium tetra-chloride and (B) an organic aluminum compound is very effective to obtain high crystalline poly-α-olefins and that in the case where tri-alkyl aluminum and an alkyl aluminum halide are not independently used but are both used together, an unexpectedly sharp increase in catalyst polymerization activity is obtained.

In the Japanese Laid-Open Patent Publication Nos. 15589/77 and 23188/77, there is disclosed a catalyst comprising a carrier bound titanium component of a composition containing a complex made with a titanium halide and a Lewis base in magnesium halide, tri-alkyl aluminum, Lewis base and an alkyl aluminum halide. However, with this catalyst, it can scarcely be expected to obtain a large enough yield of polypropylene as applicable to the non-deashing process and both the polymerization activity of the catalyst and the total II are not satisfactory. Titanium component supported on a carrier is improved by a novel preparation process.

The inventors of the present invention studied in detail a polymerization process using a carrier type catalyst having high activity suitable for the non-deashing process and capable of giving poly-α-olefins of high crystallinity.

As a result, we found that a catalyst composed of
(A) a titanium composition obtained by heating a co-comminuted mixture of a magnesium halide and a complex of an aluminum halide and a carboxylic acid ester, with titanium tetra-chloride and
(B) an organic aluminum compound, and optionally added thereto at least one component selected from
(C) an alkyl aluminum halide
(D) a carboxylic acid ester and/or its complex formed with an aluminum halide
is very effective for the polymerization.

The polymerizing activity of the catalyst may be improved by adding the component (C) and/or (D), while maintaining harmony with the total II. A catalyst embodying the presnet invention has such technical importance that it makes the non-deashing process possible.

The magnesium halide used may be magnesium chloride or magnesium bromide; preferably magnesium chloride, and is used as a substantially dry anhydrous salt, because the magnesium halide per se is hygroscopic and liable to easily deliquesce.

As the aluminum halide of the component (A), aluminum chloride or aluminum bromide is preferably used.

As the carboxylic acid ester, an aromatic, aliphatic, or alicyclic carboxylic acid ester of the formula:

R¹COOR²

(wherein R¹ and R² may be a same or different aromatic, aliphatic or alicyclic radical of C$_{1-12}$.) may be used. For example, methyl benzoate, ethyl benzoate, propyl benzoate, phenyl benzoate, ethyl toluylate, ethyl anisate, ethyl naphthoate, ethyl acetate, n-butyl acetate, ethyl methacrylate, ethyl hexahydrobenzoate and the like may be mentioned.

The aforesaid complex may be prepared by a known method, for example, by mixing a carboxylic acid ester and an aluminum halide at ambient temperature or by heating the mixture. The molar ratio of carboxylic acid ester to aluminum halide is preferably 1:1. However, this ratio is not critical and excess of either compound can be tolerated.

In embodiments of the present invention, in preparing component (A) a composition is prepared in advance by co-comminuting a complex of an aluminum halide and a carboxylic acid ester and a magnesium halide. The comminuting method employing may be conducted by any suitable known method used in preparing a titanium component of the Ziegler-Natta catalyst. The comminuting operation is carried out in a vacuum or in an inactive atmosphere and should be done in a state where moisture, oxygen and the like have completely been removed. The composition prepared in advance is composed of 10~95 wt. % of magnesium halide, preferably 20~90 wt. % and 90~5 wt. % of the complex of aluminum halide and carboxylic acid ester, preferably 80~10 wt. %.

Then, the composition is subjected to heat-treatment together with titanium tetra-chloride or a mixture of titanium tetra-chloride and an inert solvent.

The heat-treatment is preferably carried out by suspending the above composition in titanium tetra-chloride or a mixture of titanium tetra-chloride and an inert solvent, subjecting the suspension to heat-treatment for a few minutes to several hours at 40°~135° C., and thereafter, rinsing out titanium tetra-chloride with an inert solvent or drying same under reduced pressure, if desired.

With the heat treatment, a composition binding titanium compound, i.e. the component (A) is obtained and the component (A) thus obtained generally contains 0.1~10 wt. % of titanium atoms.

The component (B) is an organic aluminum compound of the formula:

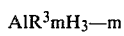

AlR³mH$_{3-m}$ wherein R³ is an alkyl radical of C$_{1-12}$, and m is a number defined by 1.5≦m≦3.

For example, tri-methyl aluminum, tri-ethyl-aluminum, tri-n-propyl aluminum, tri-n-butyl aluminum, tri-iso-butyl aluminum, tri-n-hexyl aluminum, di-ethyl-aluminum hydride and the like may be used.

The ratio of the component (A) and the above organic aluminum compound used may be varied in a wide range. In general, the atomic ratio of titanium contained in the component (A) to aluminum contained in the above aluminium compound may be varied in the range of Ti:Al=1:1~300, preferably Ti:A=1:3~100 in order to improve the crystallinity of the resultant polymer.

As the component (C) an alkyl aluminum halide of the formula

AlR⁴$_n$X$_{3-n}$ (wherein R⁴ stands for an alkyl group of C$_{1-12}$, X a halogen atom and n an number of 1≦n≦2) such as, for example, di-ethyl aluminum mono-chloride, ethyl aluminum sesqui-chloride ((C$_2$H$_5$)$_3$Al$_2$Cl$_3$); ethyl aluminum-di-chloride, di-ethyl aluminum mono-bromide, di-ethyl aluminum mono-iodide, di-ethyl aluminum mono-fluoride, di-n-propyl aluminum mono-chloride, di-iso-butyl aluminum mono-chloride, di-n-hexyl aluminum mono-chloride and the like may be used.

The ratio of the component (B), i.e., the organic aluminum compound and the component (C), i.e., the alkyl aluminum halide, may be varied in a wide range. In general, the molar ratio of the component (B) to the component (C) is in the range of (B):(C)=1:0.05~100, preferably in the range of (B):(C)=1:0.1~30.

The present catalysts can be applied to homopolymerization of α-olefins of C$_{3-12}$, copolymerization of the α-olefins and block copolymerization or random copolymerization of α-olefins and ethylene. As the above α-olefins, propylene, 1-butene, 1-hexene and 4-methyl-pentene-1 and the like may be mentioned.

A polymerization method embodying the present invention may be conducted under a procedure conventionally carried out in the technical field. Namely, the polymerization temperature is in the range of 20°~300° C. preferably 50°~200° C. and the polymerization pressure is in the range of 1~200 Kg/cm² abs., preferably 1~150 Kg/cm² abs. In the polymerization, aliphatic, aromatic or alicyclic hydrocarbons may be used independently or in the form of mixtures thereof as a polymerization solvent. Among these hydrocarbons, propane, butane, pentane, hexane, heptane, cyclohexane, benzene, toluene and the like or mixtures thereof are preferably used. Further, a mass polymerization using a liquid α-olefin per se a solvent may be carried out. Furthermore, the present catalysts may be applied to the so-called gas-phase polymerization being carried out by contacting a gaseous α-olefin with the catalyst in the state of substantial absence of a solvent.

The molecular weight of the resultant polymer varies depending on polymerization mode, catalyst used and polymerization conditions, and may be controlled by adding, for example, hydrogen, an alkyl halide, di-alkyl zinc and the like.

The activity of the present catalysts may be improved in a wide range without excessively lowering the crystallinity of a resultant polymer, and this is of considerable technical importance. The actual results obtainable will be clear from the Examples which follow hereinafter.

In the Japanese Laid-Open Patent Publication Nos. 15586/77 and 23188/77, the yields of the resultant polymers as shown in the Publications are so low that the deashing step cannot be applied.

A carboxylic acid ester or a complex composed of a carboxylic acid ester and an aluminum halide is optionally used as component (D). In this case, the complex of carboxylic acid ester and aluminum halide used in the preparation of the aforesaid component (A) or the carboxylic acid ester which is used in the preparation of the complex may be used.

Addition of the component (D) may be carried out, for example, as follows: a mixture previously made by mixing the component (D) with at least one component selected from the components (A), (B) and (C) is admixed with the other components, or the component (D) is added to a mixture previously made by mixing the components (A), (B) and (C). As noted above, these components may be mixed regardless of mixing sequence.

The amount of the component (D) to be used may be varied depending on various conditions such as amounts of the component (B) and (C), titanium content in the component (A) and polymerization temperature etc. In general, it is used in a range of 5 moles or less per one mole of the component (B), preferably in the range of (B):(D)=1:0.01~1.5 in molar ratio. As shown in the following Examples wherein the component (D) has not been added, the total II is in the extent of 91~91.5 wt. % but the total II may be increased by 93~95 wt. % by mixing the component (D).

The present invention will be further illustrated by way of the following Examples.

EXAMPLE 1

A vibration mill equipped with a 600 ml pulverizing pot containing 80 steel balls of 12 mm in their diameter was prepared.

Into the pot, were put 20.0 g of magnesium chloride and 10.0 g of a complex of aluminum chloride and ethyl benzoate in a nitrogen atmosphere to comminute the mixture for 20 hours.

Into a 300 ml round bottomed flask, were put 10 g of the above pulverized mixture and 200 ml of titanium tetra-chloride and the contents stirred at 80° C. for 2 hours. Thereafter, the supernatant liquid in the flask was removed by decantation, and then, 200 ml of n-heptane was added to the flask and the contents stirred at room temperature for 30 minutes. Following the agitation of the contents, the supernatant liquid in the flask was removed by decantation. The above washing operation was repeated 7 times. Thereafter, 200 ml of n-heptane were further added to obtain a slurry containing an activated titanium component.

A part of the slurry was sampled and n-heptane was evaporated for analysis of the slurry content. The analysis showed that 1.20 wt.% of Ti had been contained in the activated titanium component.

Into a 2 liter autoclave of SUS-32 (a stainless steel designated by Japanese Industrial Standard), were charged one liter or n-heptane, 0.20 g of the aforesaid activated titanium component (0.05 mM as titanium) and 0.07 ml of tri-ethyl aluminum (0.5 mM) in a nitrogen atmosphere.

Following the evacuation of nitrogen present in the autoclave with a vacuum pump, hydrogen was charged therein up to 0.3 Kg/cm² gas phase partial pressure, and then propylene was charged to make the gas phase pressure 2 Kg/cm² gauge. The content of the autoclave was heated in such a manner that the inner temperature was raised to 70° C. after 5 minutes and polymerization was continued for 2 hours while charging propylene so as to maintain the polymerization pressure at 5 Kg/cm² gauge at 70° C.

After cooling the autoclave, unreacted propylene was removed in order to take out and filter the contents.

The contents were then dried under reduced pressure at 60° C., giving 370 g of white, powdered polypropylene.

The weight ratio to this polypropylene of a residual polymer obtainable when subjected to extraction with boiling n-heptane (hereinafter referred to as powdered II) was 96.5%, the specific gravity determined volumetrically 0.33 g/ml and the intrinsic viscosity thereof 1.90 dl/g. (determined in a tetralin solution at 135° C.)

As the filtrate was concentrated, 17 g of a polymer soluble to n-heptane was obtained. The total II thereof was 92.2%.

Further, the polymerization activity of the catalyst used in the polymerization was 81 Kg/g-Ti.hr. and the amount of the polymer obtained 161 Kg/g-Ti.

EXAMPLE 2

Mass polymerization of propylene was carried out with the activated titanium component as prepared in Example 1.

Into a 6 liter autoclave of SUS-32, were charged 0.20 g of the activated titanium component suspended with 30 ml of n-heptane and 0.1 ml of tri-ethyl aluminum in nitrogen atmosphere. Following the removal of nitrogen present in the autoclave with a vacuum pump, 2.5 Kg of propylene and 0.5 Nl of hydrogen were charged therein.

The contens of the autoclave were heated in such a manner that the inner temperature rose to 75° C. after 5 minutes and the polymerization was carried out for 3 hours at 75° C.

After cooling the autoclave, the unreacted propylene was removed and the contents were taken out.

After drying the content under reduced pressure, 908 g of powdered polypropylene was obtained.

The total II of the resultant polypropylene powder was 93.5%, intrinsic viscosity 1.95 dl/g and volumetric specific gravity 0.38 g/ml.

Further, the polymerization activity of the catalyst used in the polymerization was 126 Kg/g-Ti.hr. and the amount of polymer obtained was 378 Kg/g-Ti.

EXAMPLE 3

Similar experiments as described in Example 2, were carried out except that 0.15 ml of tri-iso-butyl aluminum was used in place of tri-ethyl aluminum, giving 880 g of polypropylene powder.

The total II of the resultant polypropylene was 93.0%, the volumetric specific gravity 0.36 g/ml and the intrinsic viscosity 1.95 dl/g.

Further, the polymerization activity of the catalyst used in the polymerization was 122 Kg/g-Ti.hr. and the amount of polymer obtained was 367 Kg/g-Ti.

The powder II of the polymer was 70.3%, the intrinsic viscosity 1.80 dl/g and the volumetric specific-gravity 0.22 g/ml.

From the filtrate, 30.5 g of non-crystalline polypropylene was obtained.

The total II of the resultant polymer was 55.0%, the polymerization activity of the catalyst used 11.7 kg/g-Ti.hr. and the amount of the resultant polymer 23.4 Kg/g-Ti.

CONTROLS 3 AND 4

Results of repeated polymerizations carried out with a catalyst having ethyl benzoate added thereto as the third component of the catalyst system for the purpose of improvement of the catalyst system used in Control 2 are shown in Table 1. In case of adding ethyl benzoate to the catalyst used in Control 2, the total II of the resultant polymer was increased but not satisfactory and the catalyst activity was greatly lowered.

TABLE 1

| Run No. | Amount of ethyl benzoate used (g) | Polymerization time (hr.) | Yield of polypropylene powder (5) | Yield of non-crystalline polypropylene (g) | Catalyst activity (Kg/g-Ti.hr,.) | Amount of polymer obtained (Kg/g-Ti) | Analytical value Total II (wt. %) | Intrinsic viscosity (dl/g) | Bulk density |
|---|---|---|---|---|---|---|---|---|---|
| Control 3 | 0.02 | 3 | 62 | 5 | 5.6 | 11.2 | 83.2 | 1.55 | 0.20 |
| Control 4 | 0.05 | 2 | 30 | 3 | 2.8 | 5.5 | 82.8 | 1.71 | 0.22 |

CONTROL 1

A titanium component containing 3 wt.% of titanium was prepared with 26.4 g of magnesium chloride and 3.6 g of titanium tetra-chloride in the same manner as set forth in Example 1.

Polymerization was carried out in the same manner as described in Example 1 with a catalyst composed of 0.20 g of the resultant titanium composition and 0.10 g of tri-ethyl aluminum. The polymerization was ceased after 3 hours. The autoclave was cooled and the content was taken out. The major portion of the content was so viscous, and could not be filtered, that the polymer was precipitated with a large amount of acetone, then filtered and dried, giving 285 g of a polymer. The total II of the resultant polymer was 21.3%.

CONTROL 2

A titanium component containing 3 wt.% of titanium was prepared by co-comminuting a mixture composed of 23.6 g of magnesium chloride and 6.4 g of a complex of titanium tetra-chloride and ethyl benzoate in the same manner as described in Example 1.

Polymerization was carried out in the same manner as described in Example 1 with a catalyst composed of 0.20 g of the resultant titanium component and 0.1 ml of triethyl aluminum, giving 110 g of polypropylene powder in 2 hours of the polymerization time.

CONTROL 5

Following the co-comminution of 24.7 g of magnesium chloride and 5.3 g of ethyl benzoate in the same manner as described in Example 1, the co-comminuted mixture was subjected to the same reaction with titanium tetra-chloride and the same washing operation as described in Example 1, giving an activated titanium composition containing 1.21 wt. % of titanium.

Polymerization was carried out for 2 hours in the same manner as described in Example 1 with 0.20 g of the activated titanium composition and 0.07 ml of tri-ethyl aluminum, giving 218 g of powdered polypropylene and 25 g of n-heptane-soluble-polypropylene.

The powder II of the powdered polypropylene was 95.0%, the volumetric specific gravity 0.28 g/ml and the intrinsic viscosity 1.98 dl/g.

The polymerization activity of the catalyst used in the polymerization was 51 Kg/g-Ti.hr., the amount of the polymer obtained 101 Kg/g-Ti and the total II of same 85.2%,

EXAMPLES 4, 5, 6 and 7

In the preparation step of the activated titanium component used in Example 1, various kinds of compounds were used in place of the complex of ethyl benzoate and aluminum chloride for preparing catalysts.

Results obtained by mass polymerization carried out with these catalysts are shown in Table 2.

TABLE 2

| Run No. | Activated titanium composition Complex used in catalyst preparation | Titanium content (wt. %) | Organic aluminum compound Compound | Amount used (ml) | Polymerization time (hr.) | Yield of Polypropylene powder (g) | Catalyst activity (kg/g-Ti.hr.) | Amount of Polymer obtained (Kg/g-Ti) | Analytical Value Total II (wt. %) | Intrinsic viscosity (dl/g) | Bulk density (g/ml) |
|---|---|---|---|---|---|---|---|---|---|---|---|
| Example 4 | Me.benzoate, AlCl$_3$ | 1.33 | AlEt$_3$ | 0.1 | 3 | 913 | 114 | 343 | 93.5 | 1.93 | 0.35 |
| Example 5 | Phenyl benzoate, AlCl$_3$ | 1.50 | " | " | " | 1050 | 117 | 350 | 93.3 | 1.91 | 0.34 |

TABLE 2-continued

| Run No. | Activated titanium composition Complex used in catalyst preparation | Organic aluminum Titanium content (wt. %) | Compound | Amount used (ml) | Yield of Polymerization time (hr.) | Polypropylene powder (g) | Catalyst activity (kg/g-Ti.hr.) | Amount of Polymer obtained (Kg/g-Ti) | Analytical Value Total II (wt. %) | Intrinsic viscosity (dl/g) | Bulk density (g/ml) |
|---|---|---|---|---|---|---|---|---|---|---|---|
| Example 6 | Et.anisate, AlCl₃ | 1.20 | " | " | " | 880 | 122 | 367 | 92.9 | 1.89 | 0.37 |
| Example 7 | Et. naphthoate, AlCl₃ | 1.11 | Al(iso-Bu)₃ | 0.15 | " | 907 | 136 | 408 | 93.0 | 1.90 | 0.36 |

EXAMPLE 8, 9, 10 AND 11

Results of suspension polymerizations of propylene carried out with a catalyst composed of 0.08 g of the titanium composition as prepared in Example 1 (containing 0.02 mg-atom of titanium atoms), 0.15 g (1.05 mM) of ethyl benzoate and tri-isobutyl aluminum (the amounts used are shown in the following Table 3) are shown in Table 3.

CONTROL 6

The result of suspension polymerization of propylene, carried out in the same manner as described in Example 9, except that the titanium composition as prepared in Control 5 was used in place of the titanium composition as prepared in Example 1, is included in Table 3.

TABLE 3

| Run No. | Component (B) tri-iso-butyl aluminum (mM) | Component (C) di-ethyl aluminum (mM) | Molar ratio of Al/Ti | Polymerization time (hr.) | Yield of polypropylene powder (g) | Yield of non-crystalline polypropylene (g) | Polymerization activity (Kg/g-Ti.hr.) | Amount of polypropylene obtained (Kg/g-Ti) | Analytical value Total II (wt. %) | Intrinsic viscosity (dl/g) | Bulk density (g/ml) |
|---|---|---|---|---|---|---|---|---|---|---|---|
| Example 8 | 1.4 | — | 70 | 2 | 44 | 1.2 | 24 | 47 | 95.0 | 1.65 | 0.33 |
| Example 9 | 1.9 | — | 95 | 2 | 116 | 5.0 | 63 | 126 | 92.8 | 1.63 | 0.33 |
| Example 10 | 2.4 | — | 120 | 2 | 190 | 11.2 | 105 | 209 | 89.8 | 1.67 | 0.30 |
| Example 11 | 3.8 | — | 190 | 2 | 280 | 19.7 | 166 | 312 | 87.3 | 1.71 | 0.30 |
| Control 6* | 1.9 | — | 95 | 2 | 68 | 5 | 38 | 76 | 87.0 | 1.60 | 0.28 |

*The activated titanium composition as prepared in Control 5 was used as the component (A).

EXAMPLES 12, 13 AND 14

Results of propylene polymerization carried out in the same manner as described in Example 1 with a catalyst composed of 0.08 g of the titanium composition as prepared in Example 1, 0.35 ml of tri-iso-butyl aluminum and various amount of a complex of ethyl benzoate and a aluminum halide are showin in Table 4.

TABLE 4

| Run No. | Polymerization condition Amount of AlCl₃·PhCOOEt added g(mM) | Polymerization time (hr.) | Yield Polypropylene powder (g) | Non-crystalline polypropylene (g) | Catalyst activity (Kg/g-Ti.hr.) | Amount of polypropylene obtained (Kg/g-Ti) | Total II (wt. %) | Intrinsic viscosity (dl/g) | Bulk density (g/ml) |
|---|---|---|---|---|---|---|---|---|---|
| Example 12 | 0.07 (0.25) | 2 | 324 | 20 | 179 | 358 | 91.3 | 1.93 | 0.34 |
| Example 13 | 0.10 (0.35) | 2 | 256 | 8 | 138 | 275 | 93.3 | 1.92 | 0.34 |
| Example 14 | 0.28 (1.0) | 2 | 128 | 2.9 | 68 | 136 | 94.8 | 1.60 | 0.35 |

EXAMPLES 15, 16 AND 17

Results of suspension polymerization of propylene carried out in the same manner as described in Example 1 with catalysts composed of 1 mM of various alkyl aluminum chlorides, 0.035 ml (0.25 mM) of tri-ethyl aluminum and 0.08 g of the titanium composition as prepared in Example 1 are shown in Table 5.

CONTROL 7

Result of the same polymerization as indicated in Example 15 except that the titanium composition as prepared in Control 5 was used in place of the titanium composition as prepared in Example 1, is also shown in Table 5.

TABLE 5

| Run No. | Component (C) Alkyl-aluminum halide Compound used | Amount (mM) | Polymerization time (hr.) | Yield of polypropylene powder (g) | Yield of non-crystalline polypropylene (g) | Catalyst activity (Kg/g-Ti.hr.) | Amount of polymer totals II (Kg/g-Ti.) | Analytical value Intrinsic viscosity (wt. %) | Bulk density (dl/g) | (g/ml) |
|---|---|---|---|---|---|---|---|---|---|---|
| Example 15 | di-ethyl aluminum monochloride | 1 | 2 | 350 | 16.3 | 153 | 305 | 91.5 | 1.70 | 0.35 |
| Example 16 | ethyl aluminum sesquichloride | 1 | 2 | 338 | 17.0 | 148 | 296 | 91.0 | 1.88 | 0.33 |
| Example 17 | ethyl aluminum dichloride | 1 | 2 | 345 | 16.5 | 150 | 300 | 91.3 | 1.70 | 0.35 |

TABLE 5-continued

| Run No. | Component (C) Alkyl-aluminum halide Compound used | (mM) | Amount time (mM) | Polymer ization powder (hr.) | Yield of polypropylene propyl- (g) | Yield of non-crystalLine poly(Kg/glene (g) | Catalyst activity obtained Ti.hr.) | Amount of polymer totals II (Kg/g-Ti.) | Analytical value Total II (wt. %) | Intrinsic viscosity (dl/g) | Bulk density (g/ml) |
|---|---|---|---|---|---|---|---|---|---|---|---|
| Control 7* | di-ethyl aluminum monochloride | | 1 | 2 | 120 | 8 | 67 | 133 | 85.0 | 1.65 | 0.30 |

*The titanium composition as prepared in Control 5 was used as the component (A).

EXAMPLE 18

Mass polymerization of propylene was carried out with the titanium composition as prepared in Example 1.

Propylene was polymerized in the same manner as described in Example 2 with a catalyst composed of 0.15 ml (1.25 mM) of diethyl aluminium mono-chloride, 0.05 ml of tri-ethyl aluminum and 0.1 g (0.025 mg-atom as titanium atoms) of the titanium composition and made according to the method described in Example 2, and 885 g of polypropylene powder was obtained.

The total II of the resultant polypropylene was 92.8%, the intrinsic viscosity 1.87 dl/g and the volumetric specificagravity 0.37 g/ml.

The polymerization activity of the catalyst used was 246 Kg/g-Ti.hr. and the amount of the resultant polypropylene was 737 Kg/g-Ti.

EXAMPLE 19, 20 AND 21

Polymerization was carried out with the titanium composition prepared in Example 1 in accordance with the procedures of Example 1.

Three different amounts of diethyl aluminum monochloride as the component (C), 0.15 g (1.05 mM) of ethyl benzoate as the component (D), 0.35 ml (1.4 mM) of iso-butyl aluminum as the component (B) and 0.08 g (0.020 mg-atom) of the titanium composition as the component (A) were put into the autoclave in the above sequence to obtain a catalyst for polymerizing propylene.

Results of the polymerization carried out with varied amounts of di-ethyl aluminum mono-chloride are shown in Table 6.

TABLE 6

| Run No. | Component (B) tri-iso-butyl aluminum (mM) | Component (C) di-ethyl aluminum mono-chloride (mM) | Molar ratio of Al/Ti* | Polymerization time (hr.) | Yield of polypropylene powder (g) | Yield of non-crystalline polypropylene (g) | Catalyst activity (Kg/g-Ti.hr.) | Amount of polymer obtained (Kg/g-Ti) | Total II (wt. %) | Intrinsic viscosity (dl/g) | Bulk density (g/ml) |
|---|---|---|---|---|---|---|---|---|---|---|---|
| Example 19 | 1.4 | 0.5 | 95 | 2 | 113 | 2.6 | 60 | 120 | 94.8 | 1.59 | 0.36 |
| Example 20 | 1.4 | 1.0 | 120 | 2 | 192 | 4.6 | 103 | 205 | 93.9 | 1.62 | 0.37 |
| Example 21 | 1.4 | 2.4 | 190 | 2 | 281 | 81 | 150 | 301 | 93.0 | 1.65 | 0.37 |

*The amount of Al was determined as the total amount of Al contained in iso-butyl aluminum and di-ethyl aluminum mono-chloride.

EXAMPLE 22

Results of polymerization carried out in the same manner as described in Example 19 except that 0.284 g (1 mM) of a complex of ethyl benzoate and aluminum chloride was used in place of ethyl benzoate, the component (D), to be added to the other components in the preparation of the catalyst used in Example 19, are shown in Table 7.

TABLE 7

| Run No. | Component (B) tri-iso-butyl aluminum (mM) | Component (C) di-ethyl aluminum mono-chloride (mM) | Atomic ratio of Al/Ti | Polymerization time (hr.) | Yield of polypropylene powder (g) | Yield of non-crystalline polypropylene (g) | Catalyst activity (Kg/g-Ti.hr.) | Amount of polymer obtained (Kg/g-Ti) | Total II (wt. %) | Intrinsic viscosity (dl/g) | Bulk density (g/ml) |
|---|---|---|---|---|---|---|---|---|---|---|---|
| Example 22 | 1.4 | 0.5 | 95 | 2 | 243 | 4.8 | 129 | 258 | 94.8 | 1.60 | 0.38 |

EXAMPLES 23, 24 AND 25

Results of solution polymerizations of propylene carried out in the same manner as described in Example 20 with catalysts made using various esters in place of ethyl benzoate used as the component (D) in the above Example are shown in Table 8.

TABLE 8

| Run No. | Carboxylic acid ester Compound used | Amount used (mM) | Polymerization time (hr.) | Polypropylene powder (g) | Non-crystalline polypropylene (g) | Catalyst activity (Kg/g-Ti. hr.) | Amount of polymer obtained (Kg/g-Ti) | Total II (wt. %) | Intrinsic viscosity (dl/g) | Bulk density (g/ml) |
|---|---|---|---|---|---|---|---|---|---|---|
| Example 23 | phenyl-benzoate | 1.05 | 2 | 188 | 5 | 101 | 201 | 93.8 | 1.61 | 0.38 |
| Example 24 | ethyl anisate | 1.05 | 2 | 190 | 6 | 102 | 204 | 93.7 | 1.63 | 0.37 |

TABLE 8-continued

| Run No. | Carboxylic acid ester Compound used | Amount used (mM) | Polymerization time (hr.) | Yield Polypropylene powder (g) | Yield Non-crystalline polypropylene (g) | Catalyst activity (Kg/g-Ti. hr.) | Amount of polymer obtained (Kg/g-Ti.) | Total II (wt. %) | Intrinsic viscosity (dl/g) | Bulk density (g/ml) |
| --- | --- | --- | --- | --- | --- | --- | --- | --- | --- | --- |
| Example 25 | ethyl naphthoate | 1.05 | 2 | 195 | 4 | 104 | 207 | 93.7 | 1.65 | 0.36 |

CONTROL 9

To 0.2 g of the titanium composition as prepared in Control 2, were admixed 0.24 ml (2.0 mM) of di-ethyl aluminum mono-chloride, 0.05 ml (0.35 mM) of ethyl benzoate and 0.35 ml (1.4 mM) of tri-iso-butyl aluminum to prepare a catalyst and polymerization of propylene was carried out with the catalyst thus obtained in the same manner as described in Example 1.

The results are shown in Table 9.

CONTROL 10

The polymerization as described in Control 9 was repeated except that ethyl aluminum mono-chloride, the component (C), was not added.

The results are shown in Table 9 in comparison with Control 9.

Table 9 shows that addition of di-ethyl aluminum monochloride as seen in Control 9 increases polymerization activity of a catalyst to the extent of about 50% as compared with same in Control 10, but the results of addition of the component (C) are not so distinguishable as those embodying the present invention. Both yield of polypropylene and the total II of the resultant polymer are so low as to be 27.4 Kg/g-Ti and 83%, respectively, and the process of this control can not be practically used.

As a result, it was found that combination of the titanium component (A) used as a titanium composition in embodiments of the present invention and the component (C) is suitable for polymerizing α-olefins.

CONTROLS 11, 12 AND 13

Results obtained by polymerizing propylene with catalysts comprising; 0.20 g of titanium tri-chloride of AA type manufactured by the Stauffer Co., U.S.A. as a titanium component other than the component (A) used in embodiments of the present invention nd various amounts of di-ethyl aluminum mono-chloride to 4 mM of tri-ethyl aluminium to be added to the above titanium tri-chloride are shown in Table 10.

Appreciable results of jointly using a tri-alkyl aluminum, component (B), and an alkyl aluminum halide, component (C), both being used in embodiments the present invention, were not found in the case where titanium tri-chloride had been used as a titanium component in place of the component (A).

TABLE 10

| Run No. | Tri-ethyl aluminum (mM) | Di-ethyl aluminum mono-chloride (mM) | Polymerization time (hr.) | Yield of polymer (g) | Catalyst activity g/g-cat./hr. | Catalyst activity Kg/g-Ti hr. | Amount of polymer obtained g/g-cat. | Amount of polymer obtained Kg/g-Ti | Total II (wt. %) | Intrinsic viscosity (dl/g) | Bulk density (g/ml) |
| --- | --- | --- | --- | --- | --- | --- | --- | --- | --- | --- | --- |
| Control 11 | 4 | 1 | 2 | 275 | 688 | 2.71 | 1375 | 5.41 | 60.3 | 1.65 | impossible to measure |
| Control 12 | 4 | 3 | 2 | 268 | 670 | 2.64 | 1340 | 5.27 | 58.7 | 1.68 | impossible to measure |
| Control 13 | 4 | 5 | 2 | 270 | 675 | 2.66 | 1350 | 5.31 | 58.8 | 1.72 | impossible to measure |

What we claim is:

1. A catalyst for polymerizing α-olefins comprising:
(A) A titanium composition obtained by heat-treatment of:
(1) a comminuted mixture of 10–95% by weight of a magnesium dihalide and 90–5% by weight of a complex consisting of $AlX_3$, wherein X is a halogen, and a carboxylic acid ester of the formula $$R^1COOR^2$$

wherein $R^1$ and $R^2$ are the same or different and selected from the group consisting of aromatic, aliphatic and alicyclic radicals having 1–12 carbon atoms, the molar ratio of said carboxylic acid ester to said aluminum halide being approximately 1:1; and

TABLE 9

| Run No. | Component (B) tri-iso-butyl aluminum (mM) | Component(C) di-ethyl aluminum mono-chloride (mM) | Polymerization time (hr.) | Yield of polypropylene powder (g) | Yield of non-crystalline polypropylene (g) | Catalyst activity (Kg/g-Ti. hr.) | Amount of polymer obtained (Kg/g-Ti) | Total II (wt. %) | Intrinsic viscosity (dl/g) | Bulk density (g/ml) |
| --- | --- | --- | --- | --- | --- | --- | --- | --- | --- | --- |
| Control 9 | 1.4 | 2.0 | 2 | 155 | 9.5 | 13.7 | 27.4 | 83.0 | 1.67 | 0.27 |
| Control 10 | 1.4 | — | 2 | 102 | 5.8 | 9.0 | 18.0 | 84.0 | 1.65 | 0.20 |

Remark:
titanium compositions used in Controls 9 and 10 were not the component (A) made according to the present invention.

(2) liquid titanium tetrachloride in an amount whereby Ti constitutes 0.1–10% by weight of (A); and (B) an organic aluminum compound of the formula $$AlR^3{}_mH_{3-m}$$

wherein $R^3$ is an alkyl radical having 1–12 carbon atoms and m is $1.5 \leq m \leq 3$;
wherein (B) is present in an amount whereby the atom ratio of, titanium in (A) to aluminum in (B) is in the range of 1:1–300.

2. A catalyst according to claim 1 wherein said co-comminuted mixture is composed of 20~90 wt.% of the magnesium dihalide and 80~10 wt.% of said complex.

3. A catalyst according to claim 1 wherein said organic aluminum compound is present in such an amount that $$Ti/Al = 1:3 \sim 100.$$

4. A catalyst according to claim 1 further comprising an alkyl aluminum halide of the general formula $$AlR^4{}_nX_{3-n}$$

wherein $R^4$ is an alkyl radical having 1–12 carbon atoms, X is a halogen atom and n is a number defined by $1 \leq n \leq 2$ in such an amount that the molar ratio of said organic aluminum compound to said alkyl aluminum halide is in the range of 1:0.05~100.

5. A catalyst according to claim 4, wherein the molar ratio of the organic aluminum compound to the alkyl aluminum halide is in the range of 1:0.1~30.

6. A catalyst according to claim 1 further comprising a carboxylic acid ester of the formula $$R^5COOR^6$$

wherein $R^5$ and $R^6$ are same or different aliphatic, aromatic or alicyclic radical having 1–12 carbon atoms in such an amount that less than 5 moles of said ester is used per mole of said organic aluminum compound.

7. A catalyst according to claim 6, wherein said carboxylic acid ester is used in such an amount that the molar ratio of said organic aluminum compound to said carboxylic acid ester is in the range of 1:0.01~1.5.

8. A catalyst according to claim 1 additionally comprising a complex consisting of an aluminum halide and a carboxylic acid ester the complex being used in an amount less than 5 moles of complex per one mole of said organic aluminum compound.

9. A catalyst according to claim 8 wherein 0.01~1.5 moles of said complex per one mole of the organic aluminum compound is used.

10. A catalyst according to claim 4 further comprising a carboxylic acid ester of the formula $$R^5COOR^6$$

wherein $R^5$ and $R^6$ are same or different aliphatic, aromatic or alicyclic radical having 1–12 carbon atoms in such an amount that less than 5 moles of said ester is used per mole of said organic aluminum compound.

11. A catalyst according to claim 10 wherein said carboxylic acid ester is used in such an amount that the molar ratio of said organic aluminum compound to said carboxylic acid ester is in the range of 1:0.01~1.5.

12. A method for polymerizing an α-olefin or copolymerizing a mixture of an α-olefin and a second monomer, said method comprising contacting the α-olefin or mixture with a catalyst according to claim 1.

13. The method of claim 12 wherein the α-olefin is copolymerized with ethylene.

14. A method for polymerizing an α-olefin or copolymerizing a mixture of an α-olefin and a second monomer, said method comprising contacting the α-olefin or mixture with a catalyst according to claim 4.

15. A method for polymerizing an α-olefin or copolymerizing a mixture of an α-olefin and a second monomer, said method comprising contacting the α-olefin or mixture with a catalyst according to claim 6.

16. A method for polymerizing an α-olefin or copolymerizing a mixture of an α-olefin and a second monomer, said method comprising contacting the α-olefin or mixture with a catalyst according to claim 8.

17. A method for polyermizing an α-olefin or copolymerizing a mixture of an α-olefin and a second monomer, said method comprising contacting the α-olefin or mixture with a catalyst according to claim 10.

* * * * *